United States Patent
Myers et al.

(10) Patent No.: US 9,129,425 B2
(45) Date of Patent: Sep. 8, 2015

(54) RECONSTRUCTION OF DYNAMIC MULTI-DIMENSIONAL IMAGE DATA

(75) Inventors: Glenn Robert Myers, Barton (AU); Adrian Paul Sheppard, Fisher (AU); Andrew Maurice Kingston, Griffith (AU); Trond Karsten Varslot, Bruce (AU)

(73) Assignee: FEI Company, Hillsboro, OR (US)

( * ) Notice: Subject to any disclaimer, the term of this patent is extended or adjusted under 35 U.S.C. 154(b) by 159 days.

(21) Appl. No.: 13/997,117

(22) PCT Filed: Dec. 21, 2011

(86) PCT No.: PCT/AU2011/001664
§ 371 (c)(1),
(2), (4) Date: Sep. 12, 2013

(87) PCT Pub. No.: WO2012/083372
PCT Pub. Date: Jun. 28, 2012

(65) Prior Publication Data
US 2013/0343629 A1    Dec. 26, 2013

(30) Foreign Application Priority Data
Dec. 24, 2010  (AU) ................................ 2010905682

(51) Int. Cl.
*G06K 9/00* (2006.01)
*G06T 11/00* (2006.01)

(52) U.S. Cl.
CPC ............ *G06T 11/003* (2013.01); *G06T 11/006* (2013.01); *G06T 2211/412* (2013.01); *G06T 2211/424* (2013.01)

(58) Field of Classification Search
None
See application file for complete search history.

(56) References Cited

U.S. PATENT DOCUMENTS

| 5,270,926 A | 12/1993 | Tam |
| 6,522,775 B2 | 2/2003 | Nelson |

(Continued)

FOREIGN PATENT DOCUMENTS

| JP | 2001-512347 A | 8/2001 |
| JP | 2004-532405 A | 10/2004 |

(Continued)

OTHER PUBLICATIONS

International Search Report and Written Opinion for International Application No. PCT/AU2011/001664 mailed Feb. 23, 2012, 10 pages.

(Continued)

*Primary Examiner* — Atiba O Fitzpatrick
(74) *Attorney, Agent, or Firm* — Sterne, Kessler, Goldstein & Fox PLLC

(57) ABSTRACT

Disclosed is a method of reconstructing a multi-dimensional data set representing a dynamic sample at a series of reconstruction instants. The multi-dimensional data set comprises a static component and a dynamic component. The method comprises acquiring a plurality of projection images of the dynamic sample; reconstructing a static component of the multi-dimensional data set from the acquired projection images; acquiring a further plurality of projection images of the dynamic sample; and reconstructing a dynamic component of the multi-dimensional data set at each reconstruction instant from the further plurality of acquired projection images using a priori information about the sample. The multi-dimensional data set is the sum of the static component and the dynamic component at each reconstruction instant.

20 Claims, 5 Drawing Sheets

(56) References Cited

U.S. PATENT DOCUMENTS

| | | |
|---|---|---|
| 6,697,508 B2 | 2/2004 | Nelson |
| 6,970,585 B1 | 11/2005 | Dafni et al. |
| 2010/0266182 A1 | 10/2010 | Grass et al. |

FOREIGN PATENT DOCUMENTS

| | | |
|---|---|---|
| JP | 2011-504758 A | 2/2011 |
| WO | WO 99/42949 A1 | 8/1999 |
| WO | WO 00/26852 A1 | 5/2000 |
| WO | WO 2004/008969 A2 | 1/2004 |
| WO | WO 2004/010383 A2 | 1/2004 |
| WO | WO 2004/111936 A1 | 12/2004 |
| WO | WO 2007/031899 A2 | 3/2007 |
| WO | WO 2007/034342 A2 | 3/2007 |
| WO | WO 2008/145161 A1 | 12/2008 |
| WO | WO 2010/037233 A1 | 4/2010 |

OTHER PUBLICATIONS

International Preliminary Report on Patentability directed toward related International Patent Application No. PCT/AU2011/001664, mailed Jul. 4, 2013, from The International Bureau of WIPO; 2 pages.

Myers, G. et al., "Dynamic Tomography with a Priori Information," Applied Optics, vol. 50, No. 20, Jul. 10, 2011, pp. 3685-3690.

Batenburg K.J., and Sijbers J., "Adaptive thresholding of tomograms by projection distance minimization," Pattern Recognition 42, pp. 2297-2305 (2009).

Bonnet S., et al., "Dynamic X-Ray Computed Tomography," Proc. IEEE 91, pp. 1574-1587 (2003).

Chen G.H., et al., "Prior image constrained compressed sensing (PICCS): A method to accurately reconstruct dynamic CT images from highly undersampled projection data sets," Med. Phys. Lett. 35, pp. 660-663 (2008).

Sidky E.Y., and Pan X, "Image reconstruction in circular cone-beam computed tomography by constrained, total-variation minimization," Phys. Med. Biol. 53, pp. 4777-4806 (2008).

Supanich M., et al., Radiation dose reduction in time-resolved CT angiography using highly constrained back projection reconstruction, Phys. Med. Biol. 54, pp. 4575-4593 (2009).

Japanese Office Action directed toward related Japanese Application No. 2013-544972, dated Feb. 24, 2015, from the Japan Patent Office (JPO); 2 pages.

English language translation of Japanese Office Action directed toward related Japanese Application No. 2013-544972, dated Feb. 24, 2015, from the Japan Patent Office (JPO); 2 pages.

RECONSTRUCTION OF DYNAMIC MULTI-DIMENSIONAL IMAGE DATA

TECHNICAL FIELD

The present invention relates generally to tomographic imaging and, in particular, to reconstruction of dynamic multi-dimensional image data from tomographic scans.

BACKGROUND

X-ray computed tomography (CT) is performed by acquiring multiple one- or two-dimensional (1D or 2D) radiographs of a multi-dimensional sample from a range of different viewing angles that make up a single "scan". From this set of 1D or 2D projection images, a multi-dimensional (2D or 3D) image of the sample can be reconstructed, showing the 2D or 3D spatial distribution of X-ray linear attenuation coefficient within the sample. Non-destructive inspection of complex internal structures using high-resolution X-ray CT (micro-CT) is rapidly becoming a standard technique in fields such as materials science, biology, geology, and petroleum engineering. Historically, CT has been used solely to image static samples. An exception is medical imaging, where patient movement is often unavoidable, particularly when imaging moving organs like the heart or the lungs. Dynamic CT in the medical context refers to imaging techniques which attempt to correct for movements such as a heartbeat, and forming a high-quality static image by removing the time-evolving component.

In contrast, for most micro-CT imaging, the dynamic behaviour (time evolution) of a 3D sample is of genuine interest, and not necessarily the result of involuntary or periodic movement. For example, the displacement of one immiscible fluid by another inside a porous material is a notoriously difficult problem in geology, both because of the complexity of the underlying physics and because standard experiments reveal very little about the micro-scale processes. Multiphase displacements are central to oil production since the manner in which water displaces oil in a geological formation determines whether, and how, oil can be economically extracted from that formation. In-place four-dimensional (4D) experimental data (3D over time) is extremely expensive to obtain and returns frustratingly little information; modelling studies are cheaper and provide more insight but lack true predictive power. Micro-scale comparisons between experiment and models are sorely needed for the modelling to be useful. Dynamic micro-CT is in principle a suitable modality for obtaining such 4D experimental data under laboratory conditions.

Conventional methods for performing CT reconstruction on radiographic image sets include filtered backprojection (FBP), Fourier inversion, and various iterative schemes such as algebraic reconstruction technique (ART), simultaneous iterative reconstruction technique (SIRT), and the related simultaneous algebraic reconstruction technique (SART). Such techniques all assume that (i) the sample is static, and (ii) the structure of interest within the sample falls entirely within the field of view of each radiograph. If the sample changes during acquisition, the radiographs will be inconsistent with one another, leading to artefacts and/or blurring of the reconstructed image. In practice this means that conventional CT imaging is restricted to situations where the sample is effectively static for the time it takes to acquire a full set of radiographs.

It has been proven that the CT reconstruction problem is mildly unstable with respect to high-frequency experimental noise, and that radiographs at approximately $\pi N/2$ viewing angles are required in order to accurately reconstruct a 3D image on an $N^3$ grid of volume elements (voxels). As the acquisition time for each radiograph is proportional to $N^2$, the maximum achievable time-resolution using conventional CT reconstruction techniques is proportional to $N^3$. In other words, using conventional CT, the amount of time the sample must remain essentially static increases in proportion to the desired spatial resolution.

For lab-based CT systems, increasing spatial resolution means using a source that emits X-rays from a smaller region, meaning that an electron beam must be focussed onto a smaller region of target material. This fundamentally limits beam power since too much energy focussed onto too small a region vaporises the target material. In turn, this imposes a lower limit on the amount of time required to acquire a single radiograph at an acceptable signal-to-noise ratio (SNR). Consequently, a high-resolution, lab-based CT scan typically takes between four and fifteen hours, an unacceptable time resolution for imaging dynamically evolving samples of current interest.

SUMMARY

It is an object of the present invention to substantially overcome, or at least ameliorate, one or more disadvantages of existing arrangements.

Disclosed are methods of dynamic (2D+time or 3D+time) CT imaging of dynamic (time-evolving) 2D or 3D samples, using conventional, lab-based CT imaging systems. The disclosed methods make use of a priori information about the sample being imaged to enable more stable reconstruction of the dynamic image from a smaller number of acquired projection images and thereby improve the temporal resolution over conventional methods.

According to a first aspect of the present invention, there is provided a method of reconstructing a multi-dimensional data set representing a dynamic sample at a series of reconstruction instants, the multi-dimensional data set comprising a static component and a dynamic component, the method comprising: acquiring a plurality of projection images of the dynamic sample; reconstructing the static component of the multi-dimensional data set from the acquired projection images; acquiring a further plurality of projection images of the dynamic sample; and reconstructing the dynamic component of the multi-dimensional data set at each reconstruction instant from the further plurality of projection images using a priori information about the dynamic sample, the multi-dimensional data set being the sum of the static component and the dynamic component at each reconstruction instant.

According to a second aspect of the present invention, there is provided a method of reconstructing a series of multi-dimensional images representing a dynamic sample at a series of reconstruction instants from a set of projection images of the sample acquired at a plurality of acquisition instants and corresponding viewing angles, the method comprising, at each reconstruction instant: projecting a current estimate of the multi-dimensional image at the reconstruction instant at the viewing angles to form a plurality of projections; forming difference images from the projections and from a sequence of the projection images, wherein the sequence comprises consecutive projection images, acquired at acquisition instants surrounding the reconstruction instant; normalising the difference images by the projected path length through the sample; backprojecting the normalised difference images; and adding the backprojection to the current estimate of the multi-dimensional image at the reconstruction instant.

Other aspects of the invention are also disclosed.

DESCRIPTION OF THE DRAWINGS

At least one embodiment of the present invention will now be described with reference to the drawings, in which.

DETAILED DESCRIPTION

Figure 1:
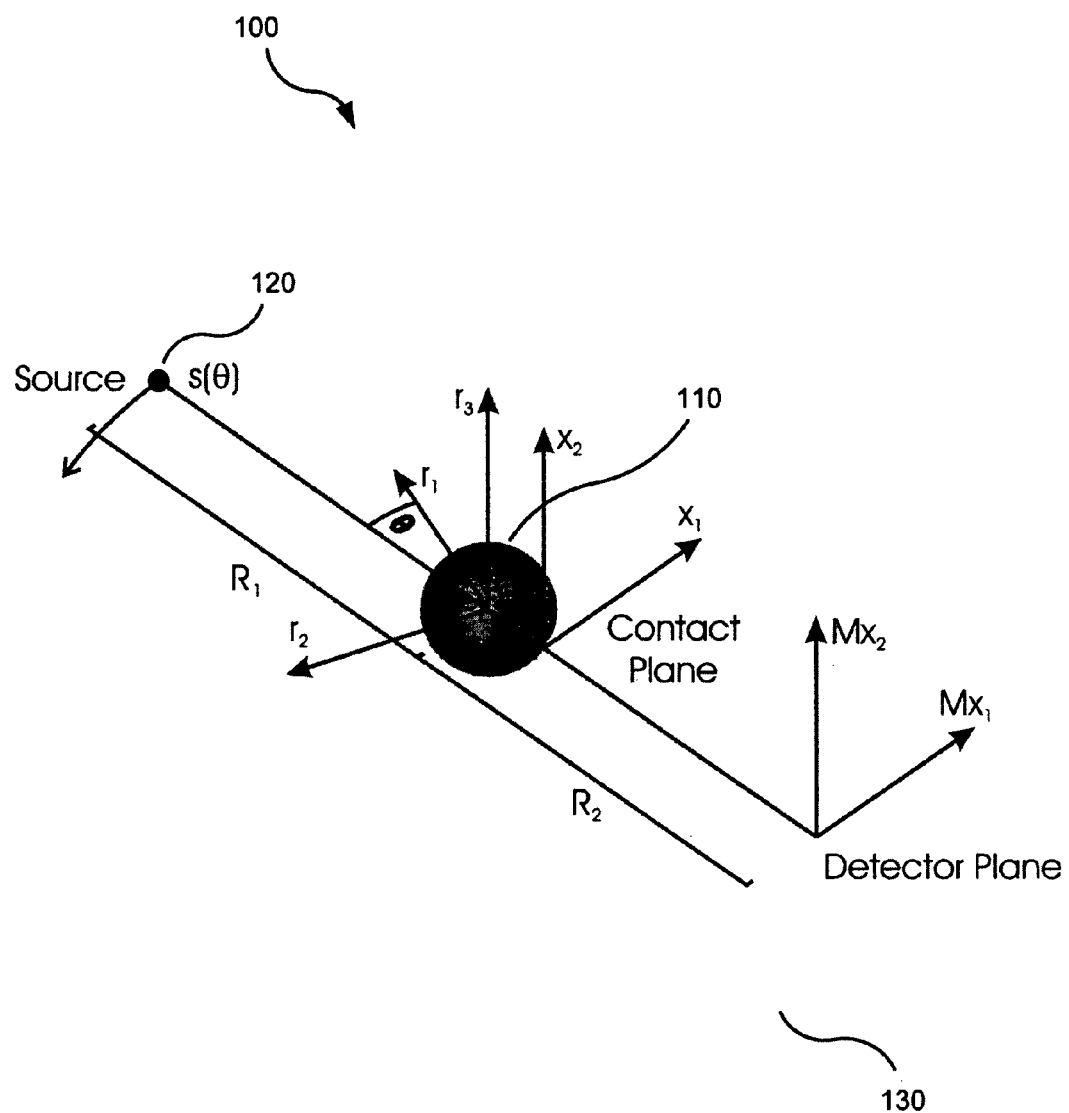
FIG. 1 illustrates a typical cone-beam CT imaging geometry with coordinate systems within which the embodiments of the invention are described.

Where reference is made in any one or more of the accompanying drawings to steps and/or features, which have the same reference numerals, those steps and/or features have for the purposes of this description the same function(s) or operation(s), unless the contrary intention appears.

The disclosed methods of dynamic CT reconstruction "factor out" the static features of the sample and concentrate on the relatively small changes occurring between one acquisition instant and the next. Intuitively, this is similar to motion picture encoding, where the dynamic signal is encoded using as little data as possible. The usage of data compression schemes in reconstruction problems (referred to as "compressed sensing") has a sound mathematical foundation. Compressed-sensing (CS) methods have been developed for CT reconstruction of static samples which exhibit minimal spatial change. Such "CS-CT" methods treat CT reconstruction as an optimisation problem where the cost function is an appropriately weighted combination of (i) the discrepancy between the solution and the measured data and (ii) the "total variation" (i.e. the L1 norm of the gradient) of the solution. This cost function is minimised over all images that are consistent with a priori information about the sample.

In discrete tomography (DT), it is assumed a priori that a static sample may be represented using only a few (typically two) gray levels. DT techniques allow reconstruction from far fewer radiographs than would otherwise be required, leading to proportional reductions in scan time and/or X-ray dose. The disclosed methods also utilise appropriate a priori information about a dynamic sample. The reconstruction problem is thereby altered so as to break the proportional relationship between the scan time and the spatial resolution of the reconstruction, thereby enabling improved time resolution of dynamic micro-CT imaging by approximately one order of magnitude.

The disclosed methods formulate the reconstruction problem as an optimisation problem, with appropriate constraints derived from a priori information. Consequently, the disclosed methods incorporate elements of both DT and CS. The disclosed methods are applicable to samples composed of: (i) features that are complex, but static; and (ii) dynamic features, about which a priori information may be formulated.

FIG. 1 illustrates a typical cone-beam CT imaging geometry 100 with coordinate systems within which the embodiments of the invention are formulated. The cone-beam CT imaging geometry 100 is suitable for modelling conventional lab-based CT 3D imaging systems. A 2D imaging geometry may be formulated as a special case of the 3D imaging geometry 100 with a 2D sample ($r_3$=constant) and a detector that is one (or more) pixels high. The reconstruction methods described may be applied to other CT imaging geometries with sufficiently well-behaved projection and backprojection operators: plane-beam, fan-beam, helical, etc.

A 3D Cartesian sample space coordinate system $r=(r_1, r_2, r_3)$ is fixed relative to and centred on the 2D or 3D sample 110 being imaged. The sample 110 is modelled using its linear attenuation coefficient $\mu(r, t)$, where t is time. The sample 110 is initially (i.e. for t<0) in a static state. At t=0 a dynamic process is initiated (e.g. a pump is switched on). Conceptually speaking, the disclosed methods separate out the changes occurring from moment to moment, and reconstruct these changes. In one implementation, the sample is separated into a static component modelled as $\mu_s(r)$, and a continuously-changing dynamic component modelled as $\mu_d(r, t)$:

$$\mu(r, t) = \begin{cases} \mu_s(r) & t < 0 \\ \mu_s(r) + \mu_d(r, t) & t \geq 0 \end{cases} \quad (1)$$

In one implementation, the a priori knowledge about the linear attenuation coefficient $\mu(r, t)$ comprises three assumptions:

1. The dynamic component $\mu_d(r, t)$ may be accurately represented using only a few gray levels (as in e.g. an incompressible fluid, two-phase flow, reactive flow, or compression of a rock). In the case of non-reactive fluid flow through a micro-porous rock, the number of gray levels is two, representing fluid present/not present. In the case of an 'n'-phase reactive flow, an additional, negative gray level may be added to represent the erosion of rock; this new gray level may only exist in regions that were previously filled with rock. In a rock compression application, assumption 1 is formulated to enforce conservation of mass and gray levels from one reconstruction instant to the next.

2. The instantaneous change of the dynamic component $\mu_d(r, t)$ is small. In the case of non-reactive or reactive fluid flow through a micro-porous rock, the instantaneous change is spatially localised. In other applications, e.g. rock compression, instantaneous change will occur throughout the sample; in such applications, a more appropriate formulation of assumption 2 is that features in the sample do not move far.

3. Support information for the dynamic component $\mu_d(r, t)$ (e.g. pores or sample boundaries) may be derived from the static component $\mu_s(r)$. In the case of non-reactive fluid flow through an impermeable, micro-porous, static scaffold, this assumption is formulated so that the pore-space of the scaffold (the complement of the support region of the static component $\mu_s(r)$) is the support region of the fluid (the dynamic component $\mu_d(r, t)$). In a reactive flow application, the support region of the dynamic component $\mu_d(r, t)$ will grow over time as the scaffold is eroded. This assumption can then be formulated by slowly expanding the support region of the dynamic component $\mu_d(r, t)$ at a rate consistent with the known properties of the fluid flow. In a rock compression application, sample structure, mass, and boundaries can be derived from the static component $\mu_s(r)$.

The sample 110 is irradiated with divergent radiation from a micro-focus X-ray source 120 of intensity (incident on the sample) of $I_{in}$, at a distance $R_1$ from the sample, and with position $s(\theta) = (R_1 \cos \theta, R_1 \sin \theta, 0)$ in the sample coordinate system r, where θ is the "viewing angle" between source and sample in the horizontal plane. (The plane-parallel scanning geometry typically found at synchrotrons is a limiting case of the cone-beam geometry 100, as $R_1$ tends to infinity.)

The X-ray intensity is measured by a 2D position-sensitive detector 130 in a detector plane at a distance $R_2$ "downstream" of the sample 110. The detector 130 is fixed relative to the source 120. $x = (x_1, x_2)$ is a 2D Cartesian coordinate system in the plane of the origin r=0 perpendicular to the axis from source 120 to detector 130. The sample 110 is rotated through a variety of viewing angles θ, and a sequence of radiographs is acquired. The sample coordinate system r rotates with respect to the source coordinate system x. It is assumed that the dynamic component $\mu_d(r, t)$ does not change during the acquisition of a single image.

Mx is a 2D Cartesian coordinate system in the plane of the detector 130, where M is the system magnification (equal to $R_2/(R_1+R_2)$). Assuming the projection approximation is valid, the image intensity I acquired at detector coordinate Mx, viewing angle θ, and acquisition time t is given by $$I(Mx, \theta, t) = I_{in} \exp[-g(Mx, \theta, t)], \quad (2)$$

where $g(Mx, \theta, t)$ is the contrast at the detector 130 defined by $$g(Mx, \theta, t) = (P\mu)(x, \theta, t) \quad (3)$$

where P denotes the cone-beam X-ray projection operator defined by $$(P\mu)(x, \theta, t) = \int_0^\infty \mu\left[s(\theta) + \frac{p}{|p|}, t\right] ds \quad (4)$$

for $$p = (r_2 \cos \theta - r_1 \sin \theta, R_1 - r_1 \cos \theta - r_2 \sin \theta, r_3) \quad (5)$$

The disclosed reconstruction methods reconstruct the dynamic (time-evolving) linear attenuation coefficient $\mu(r, t)$ on an $N^3$ voxel grid of sample coordinates r and a series of reconstruction instants t from the images $I(Mx, \theta, t)$.

To achieve this, the static component $\mu_s(r)$ and the dynamic component $\mu_d(r, t)$ are reconstructed separately. The static component $\mu_s(r)$ may be imaged at leisure during t<0, i.e. before the dynamic process is initiated at t=0, since the dynamic component $\mu_d(r, t)$ is then zero. To do this, a set of πN/2 static projection images $I_s(Mx, \theta)$ is acquired during a single scan of πN/2 viewing angles θ evenly spaced at 4/N radians over a complete revolution, and the static component $\mu_s(r)$ reconstructed using a standard 3D, CT reconstruction algorithm on the static contrast $g_s(x, \theta)$. In one implementation, suitable for the cone-beam geometry 100 of FIG. 1, the reconstruction algorithm is Feldkamp-Davis-Kress (FDK) filtered backprojection, chosen for its computational efficiency:

$$\mu_s(r) = B\left(F^{-1}\left\{|\xi_1| F\left[\frac{R_1 g_s(Mx, \theta)}{\sqrt{R_1^2 + |x|^2}}\right]\right\}\right) \quad (6)$$

where F[ ] denotes the 1D Fourier transform with respect to $x_1$, $\xi_1$ is dual to $x_1$, $F^{-1}\{\}$ denotes the inverse 1D Fourier transform with respect to $\xi_1$, and B denotes the FDK backprojection operator, defined on an image set $h(Mx, \theta, t)$ as $$(Bh)(r, t) \equiv \int_0^{2\pi} \frac{R_1^2}{p_2^2} h\left(-\frac{MR_1 p_1}{p_2}, \frac{MR_1 p_3}{p_2}, \theta, t\right) d\theta \quad (7)$$

Note that the time axis may be reversed without loss of generality; one may consider a dynamic process ending at time t=0, and reconstruct the static component of the attenuation coefficient after the process is complete. As a further alternative, if the dynamic process occurs between a start time t=0 and an end time $t=t_{end}$, both initial and final static images may be reconstructed.

If other imaging geometries are used, other known reconstruction methods appropriate for those geometries may be used in place of Equation (6).

Figure 2:
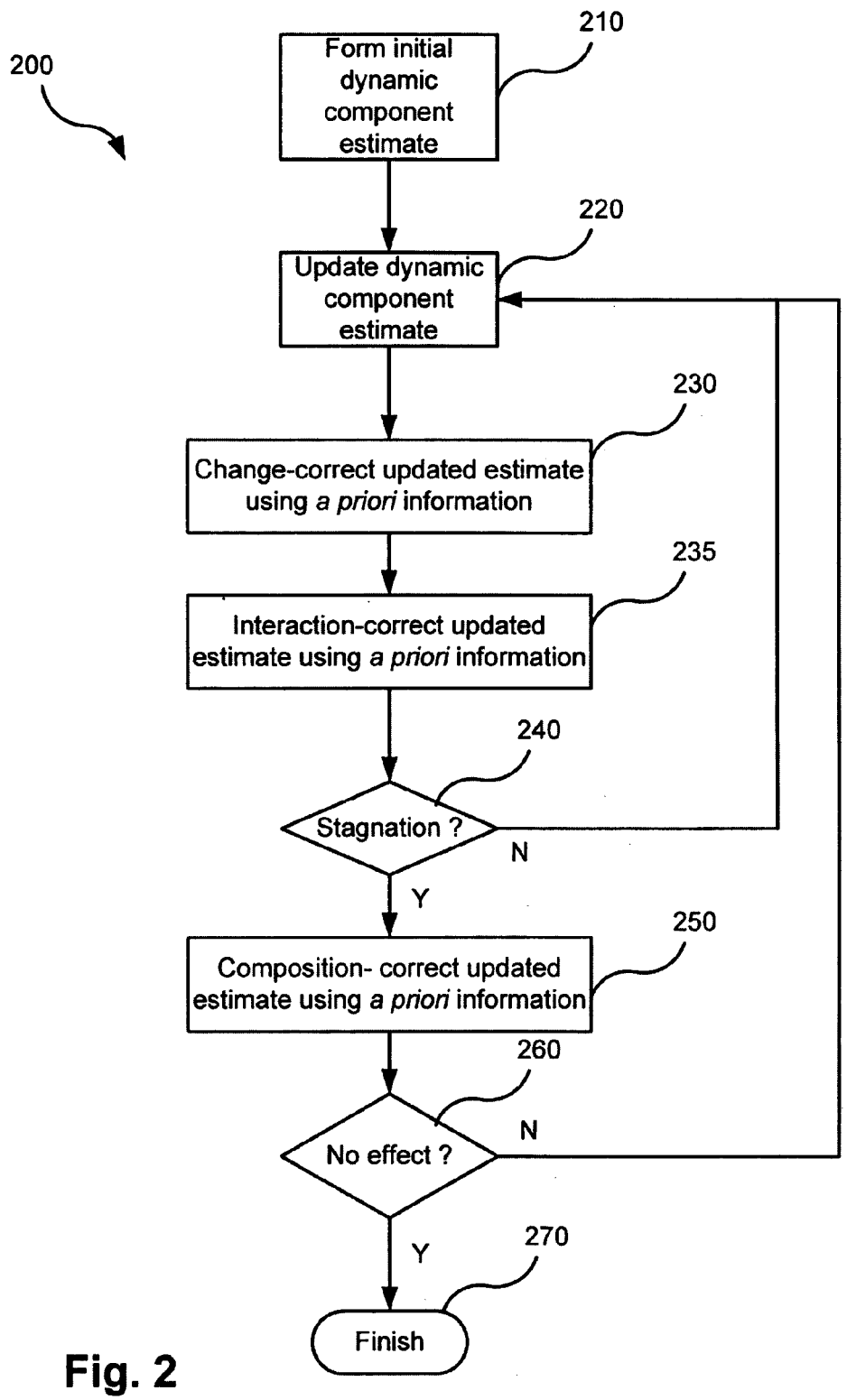
FIG. 2 is a flow chart illustrating a method of reconstructing the dynamic component of the linear attenuation coefficient of a dynamically evolving sample from a set of images acquired using the imaging geometry of FIG. 1, according to an embodiment.

FIG. 2 is a flow chart illustrating a method 200 of reconstructing the dynamic component $\mu_d(r, t)$ of the linear attenuation coefficient of a dynamically evolving sample from a set of projection images $I(Mx, \theta, t)$ acquired at a series of discrete acquisition instants t after the dynamic process was initialised at t=0, and corresponding discrete viewing angles θ, using the imaging geometry 100 of FIG. 1, according to an embodiment of the invention. The discrete viewing angles θ in general represent plural complete revolutions of the sample.

The method 200 attempts to jointly optimise, over the space of all solutions consistent with assumptions 1 and 3 above, the following quality measures: (i) the discrepancy between the solution and the measured data; and (ii) the spatial localisation of the time-derivative of the solution (under assumption 2). This joint optimisation cannot be achieved through a straightforward extension of conventional CS-CT reconstruction methods. CS-CT methods typically assume the solution space to be convex, but the space of solutions consistent with assumptions 1 and 3 above is not convex.

As a pre-processing step for the method 200, the "dynamic" contrast $g_d(Mx, \theta, t)$ due solely to the dynamic component $\mu_d(r, t)$ is obtained from the images $I(Mx, \theta, t)$ by:

Applying the projection operator P of equation (4) to the reconstructed static component $\mu_s(r)$ to obtain the "static" contrast $g_s(Mx, \theta)$; or, if the discrete viewing angles θ are a subset of the viewing angles at which the images $I_s(Mx, \theta)$ were acquired, making direct use of the measured static contrast $g_s(Mx, \theta)$ at the viewing angles θ.

Subtracting the (projected or measured) static contrast $g_s(Mx, \theta)$ from the acquired contrast $g(Mx, \theta, t)$, leaving the dynamic contrast $g_d(Mx, \theta, t)$:

$$g_d(Mx, \theta, t) = g(Mx, \theta, t) - g_s(Mx, \theta) \quad (8)$$

The method 200 is then carried out on the dynamic contrast $g_d(Mx, \theta, t)$.

If the time scale of the changes in the dynamic component $\mu_d(r, t)$ were much greater than the time to acquire a single scan of images at πN/2 viewing angles over one complete revolution, the dynamic component $\mu_d(r, t)$ at the reconstruction instant t in the middle of each scan could be reconstructed, e.g. by filtered backprojection (equation (6)), from the dynamic contrasts $g_d(Mx, \theta, t)$ acquired during that scan. This might be termed the "brute force" approach, and effectively represents a series of independent 2D or 3D reconstructions. However, in the applications of interest, the time scale of the changes in the dynamic component $\mu_d(r, t)$ is comparable to or less than the time taken to acquire a scan of images at πN/2 viewing angles over one complete revolution, so the brute force approach cannot be applied.

Instead, the method 200 incorporates a priori knowledge about the sample linear attenuation coefficient $\mu(r, t)$ to enable stable reconstruction of the dynamic component $\mu_d(r, t)$ from significantly fewer than $\pi N/2$ images $I(Mx, \theta, t)$ per complete revolution.

The series of reconstruction instants at which the dynamic component $\mu_d(r, t)$ is reconstructed are separated by a finite time resolution $\Delta$. At each reconstruction instant T, the dynamic component $\mu_d(r, T)$ is reconstructed from a sequence of consecutive dynamic contrast images $g_d(Mx, \theta, t)$ acquired at acquisition instants t surrounding the reconstruction instant T.

In one implementation, the time resolution $\Delta$ separating adjacent reconstruction instants T is chosen to be half the time required for a full revolution of the sample. In this implementation, the dynamic component $\mu_d(r, T)$ is reconstructed from a single scan of dynamic contrast images $g_d(Mx, \theta, t)$ acquired over a complete revolution of the sample, at acquisition instants t symmetrically surrounding the reconstruction instant T. That is, half the contrast images $g_d(Mx, \theta, t)$ contributing to the reconstruction of $\mu_d(r, T)$ were acquired at instants t preceding T, and half at instants t following T. Therefore, each contrast image $g_d(Mx, \theta, t)$ contributes to two reconstructions of the dynamic component: one at the reconstruction instant T preceding t, and one at the reconstruction instant T+$\Delta$ following t. There is therefore in this implementation an overlap of 50% between the successive sets of consecutive contrast images $g_d(Mx, \theta, t)$ contributing to the two reconstructions $\mu_d(r, T)$ and $\mu_d(r, T+\Delta)$. Due to the presence of this overlap, any two consecutive reconstructed images (e.g. $\mu_d(r, T)$ and $\mu_d(r, T+\Delta)$) are not entirely independent. This interdependence of consecutive reconstructed images is not present in the "brute force" approach described above. The interdependence of consecutive reconstructed images helps to enforce assumption 2 above, that changes between reconstruction instants are small. Decreasing or increasing the time resolution $\Delta$ in other implementations increases or decreases the amount of overlap between successive contributing sets of projection images.

The method 200 incorporates elements of both CS and DT techniques. In one implementation, the method 200 is based on the simultaneous iterative reconstruction technique (SIRT). SIRT is chosen for its known good performance with limited data sets. In other implementations of the method 200, any reconstruction and re-projection algorithm that is suitably well-behaved under under-sampling conditions may be used. Examples include, but are not limited to, "iterated filtered backprojection" (IFBP), SART, and ART.

Figure 3A:
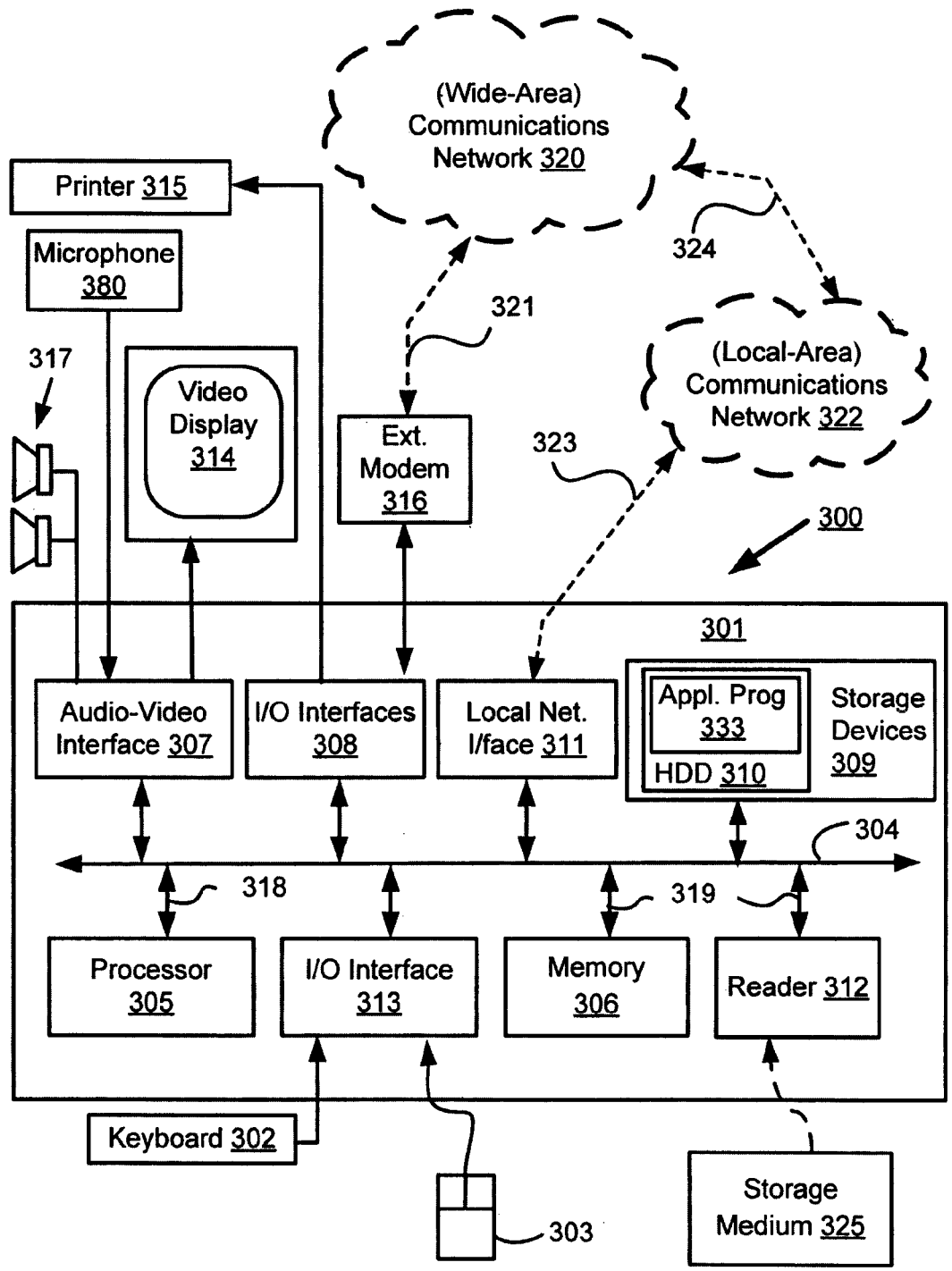
FIGS. 3A and 3B collectively form a schematic block diagram of a general purpose computer system on which the method of FIG. 2 may be practised.
Figure 3B:
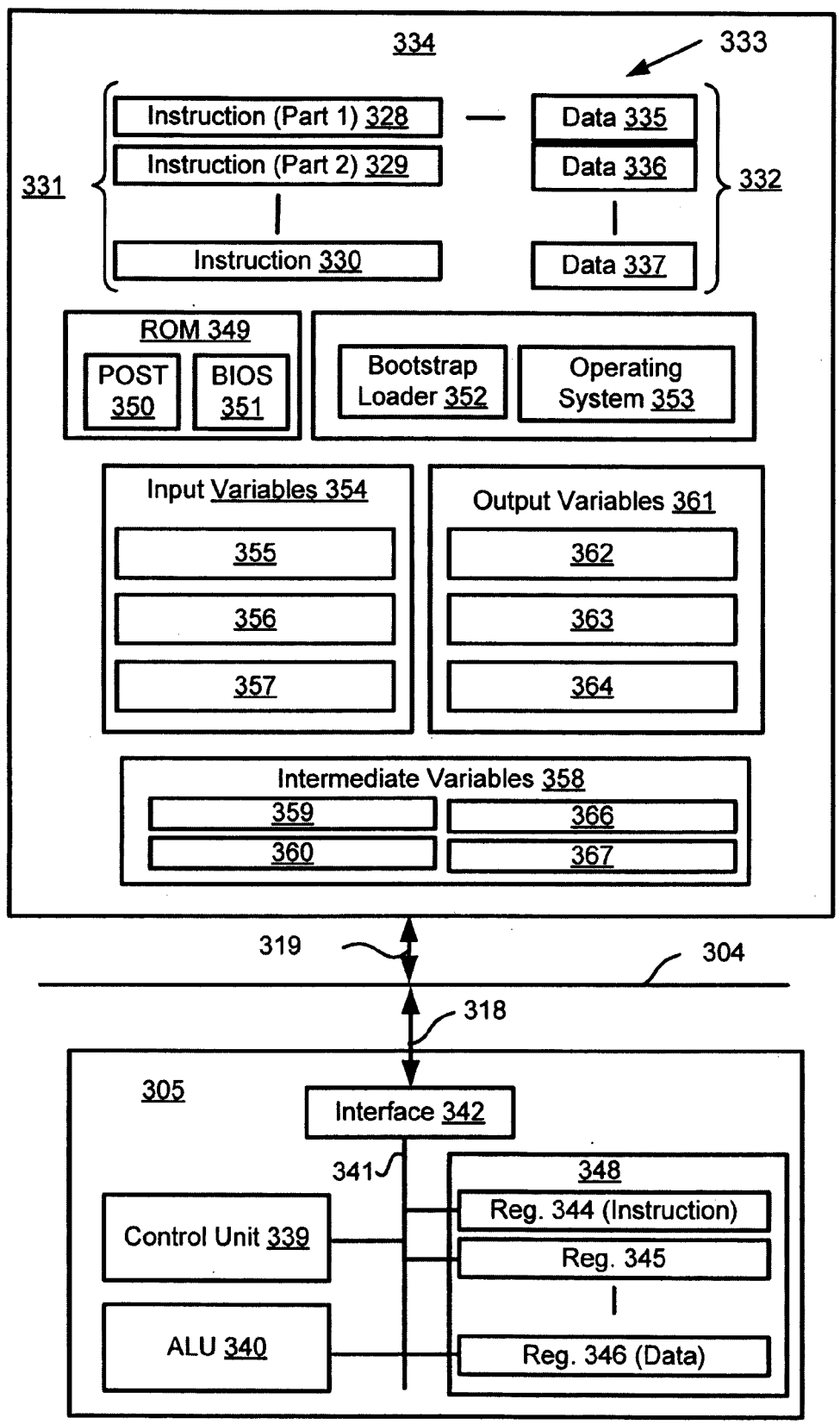

FIGS. 3A and 3B collectively form a schematic block diagram of a general purpose computer system 300, upon which the method 200 can be practised.

As seen in FIG. 3A, the computer system 300 is formed by a computer module 301, input devices such as a keyboard 302, a mouse pointer device 303, a scanner 326, a camera 327, and a microphone 380, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity (e.g. cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and semiconductor read only memory (ROM). The module 301 also includes an number of input/output (I/O) interfaces including an audio-video interface 307 that couples to the video display 314, loudspeakers 317 and microphone 380, an I/O interface 313 for the keyboard 302 and the mouse 303, and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or device of similar functionality. The interface 311 may be formed by an Ethernet™ circuit card, a Bluetooth™ wireless arrangement or an IEEE 802.11 wireless arrangement.

The interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. A reader 312 is typically provided to interface with an external non-volatile source of data. A portable computer readable storage device 325, such as optical disks (e.g. CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PCs and compatibles, Sun Sparcstations, Apple Mac™ or computer systems evolved therefrom.

The methods described hereinafter may be implemented using the computer system 300 as one or more software application programs 333 executable within the computer system 300. In particular, with reference to FIG. 3B, the steps of the described methods are effected by instructions 331 in the software 333 that are carried out within the computer system 300. The software instructions 331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 is generally loaded into the computer system 300 from a computer readable medium, and is then typically stored in the HDD 310, as illustrated in FIG. 3A, or the memory 306, after which the software 333 can be executed by the computer system 300. In some instances, the application programs 333 may be supplied to the user encoded on one or more storage media 325 and read via the corresponding reader 312 prior to storage in the memory 310 or 306. Computer readable storage media refers to any non-transitory tangible storage medium that participates in providing instructions and/or data to the computer system 300 for execution and/or processing. Examples of such storage media include floppy disks, magnetic tape, CD-ROM, DVD, a hard disk drive, a ROM or integrated circuit, USB memory, a magneto-optical disk, semiconductor memory, or a computer readable card such as a PCMCIA card and the like, whether or not such devices are internal or external to the computer module 301. A computer readable storage medium having such software or computer program recorded on it is a computer program product. The use of such a computer program product in the computer module 301 effects an apparatus for reconstructing a dynamic component.

Alternatively the software 333 may be read by the computer system 300 from the networks 320 or 322 or loaded into the computer system 300 from other computer readable media. Examples of transitory or non-tangible computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory devices (including the HDD 310 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306. A program permanently stored in a hardware device such as the ROM 349 is sometimes referred to as firmware. The POST program 350 examines hardware within the computer module 301 to ensure proper functioning, and typically checks the processor 305, the memory (309, 306), and a basic input-output systems software (BIOS) module 351, also typically stored in the ROM 349, for correct operation. Once the POST program 350 has run successfully, the BIOS 351 activates the hard disk drive 310. Activation of the hard disk drive 310 causes a bootstrap loader program 352 that is resident on the hard disk drive 310 to execute via the processor 305. This loads an operating system 353 into the RAM memory 306 upon which the operating system 353 commences operation. The operating system 353 is a system level application, executable by the processor 305, to fulfil various high level functions, including processor management, memory management, device management, storage management, software application interface, and generic user interface.

The operating system 353 manages the memory (309, 306) in order to ensure that each process or application running on the computer module 301 has sufficient memory in which to execute without colliding with memory allocated to another process. Furthermore, the different types of memory available in the system 300 must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

The processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal buses 341 functionally interconnect these functional modules. The processor 305 typically also has one or more interfaces 342 for communicating with external devices via the system bus 304, using a connection 318.

The application program 333 includes a sequence of instructions 331 that may include conditional branch and loop instructions. The program 333 may also include data 332 which is used in execution of the program 333. The instructions 331 and the data 332 are stored in memory locations 328-330 and 335-337 respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328-329.

In general, the processor 305 is given a set of instructions which are executed therein. The processor 305 then waits for a subsequent input, to which it reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from a storage medium 325 inserted into the corresponding reader 312. The execution of a set of the instructions may in some cases result in output of data. Execution may also involve storing data or variables to the memory 334.

The disclosed methods use input variables 354, that are stored in the memory 334 in corresponding memory locations 355-358. The disclosed methods produce output variables 361, that are stored in the memory 334 in corresponding memory locations 362-365. Intermediate variables may be stored in memory locations 359, 360, 366 and 367.

The register section 344-346, the arithmetic logic unit (ALU) 340, and the control unit 339 of the processor 305 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328;
(b) a decode operation in which the control unit 339 determines which instruction has been fetched; and
(c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the method of FIG. 2 is associated with one or more segments of the program 333, and is performed by the register section 344-347, the ALU 340, and the control unit 339 in the processor 305 working together to perform the fetch, decode, and execute cycles for every instruction in the instruction set for the noted segments of the program 333.

The method 200 may alternatively be practised on a Graphics Processing Unit (GPU)-based computing platform or other multi-processor computing platform similar to the computer system 300, with the ability to perform multiple small mathematical operations efficiently and in parallel.

The method 200 starts at step 210, where an initial estimate $\mu_d^{(0)}(r,t)$ of the dynamic component $\mu_d(r, t)$ is formed. In one implementation, the initial estimate $\mu_d^{(0)}(r,t)$ of the dynamic component $\mu_d(r, t)$ is identically zero. An iteration counter n is also initialised to zero.

The method 200 proceeds to step 220, where the current estimate $\mu_d^{(n)}(r,t)$ of the dynamic component $\mu_d(r, t)$ is updated at the reconstruction instants. The updating is done using a single iteration of SIRT (or another suitable algorithm; see above) to encourage consistency of the updated estimate $\mu_d^{(n)}(r,t)$ with the dynamic contrast images $g_d(Mx, \theta, t)$. To perform the update, a dynamic SIRT operator S, defined as follows, is applied to the current estimate $\mu_d^{(n)}(r,t)$:

$$(S\mu_d^{(n)})(r,t) = \mu_d^{(n)}(r,t) + B\left(\frac{g_d(Mx,\theta,t) - (P\mu_d^{(n)})(x,\theta,t)}{N(x,\theta,t)}\right) \quad (9)$$

where $N(x, \theta, t)$ is the projected path-length through the reconstruction region, and P and B are the projection and backprojection operators defined by equations (4) and (7) respectively. The dynamic SIRT operator S of equation (9) updates the current estimate $\mu_d^{(n)}(r,t)$ by projecting the current estimate $\mu_d^{(n)}(r,t)$, subtracting these projections from the dynamic contrast $g_d(Mx, \theta, t)$, normalising the difference by the projected path-length, and backprojecting the normalised difference.

For use in equation (9), both the projection and backprojection operators P and B require interpolation along the time axis, to account for the finite time resolution $\Delta$ of $\mu_d^{(n)}(r,t)$.

The iteration counter n is also incremented at step 220.

In the next step 230, the updated estimate $\mu_d^{(n)}(r,t)$ is "change-corrected" based on assumption 2 of the a priori information about the dynamic behaviour of the sample. In one implementation, suitable for the formulation of assumption 2 that instantaneous change in the dynamic component $\mu_d(r, t)$ is spatially localised, an operator $\partial_t^{-1}\overline{T}\partial_t$ is applied to the updated estimate $\mu_d^{(n)}(r,t)$, where $\overline{T}$ is a soft-thresholding operator, and $\partial_t$ the partial derivative with respect to time. The operator $\partial_t^{-1}\overline{T}\partial_t$ encourages spatial localisation of the changes in the dynamic component between one acquisition instant and the next (analogous to "sparsification" of the solution in CS terms). The threshold for the soft-thresholding operator $\overline{T}$ is chosen to be proportional to the expected signal-to-noise level of the data set.

In the next step 235, the updated estimate $\mu_d^{(n)}(r,t)$ is "interaction-corrected" using the static component $\mu_s(r)$ previously reconstructed using equation (6), based on assumption 3 of the a priori information about the interaction of the static and dynamic components of the sample. According to one implementation of step 235, appropriate when imaging a fluid flowing non-reactively through an impermeable, micro-porous, static scaffold, the spatial support region of the updated estimate $\mu_d^{(n)}(r,t)$ is assumed to be the complement of the spatial support region of the static component $\mu_s(r)$. The updated estimate $\mu_d^{(n)}(r,t)$ is therefore set to zero outside its assumed spatial support region.

The method 200 then proceeds to step 240, which tests whether the method has reached "stagnation". Stagnation occurs when the total change in the corrected, updated estimate $\mu_d^{(n)}(r,t)$ over the steps 220 and 230 of the current iteration n is less than some value $\epsilon$, typically chosen based on the signal-to-noise ratio of the radiographs. If stagnation has not occurred, the method 200 returns to step 220 for another iteration. If stagnation has occurred, the method 200 proceeds to step 250.

In step 250, the corrected estimate $\mu_d^{(n)}(r,t)$ is "composition-corrected" based on assumption 1 of the a priori information about the material composition of the dynamic component of the sample. In one implementation, suitable for the case of two-phase, non-reactive, incompressible fluid flow, in which the dynamic component is binary-valued, i.e. may be accurately represented using only two gray levels, step 250 "binarises" the corrected estimate $\mu_d^{(n)}(r,t)$. This implementation of step 250 employs a binary segmentation operator Z defined as follows:

$$Z(\mu(r,t)) = \begin{cases} \dfrac{\int_\Omega \mu(r,t)drdt}{\int_\Omega drdt}, & (r,t) \in \Omega \\ 0, & (r,t) \notin \Omega \end{cases} \quad (11)$$

where $$\Omega = \{(r,t) : |\mu(r,t)| > \epsilon'\} \quad (12)$$

The binary segmentation operator Z sets the corrected estimate $\mu_d^{(n)}(r,t)$ to zero to everywhere that the absolute value of the corrected estimate $\mu_d^{(n)}(r,t)$ is less than a noise threshold $\epsilon'$. Elsewhere, i.e. over the "non-zero" region $\Omega$, the corrected estimate $\mu_d^{(n)}(r,t)$ is set to a value that preserves the average value of the corrected estimate $\mu_d^{(n)}(r,t)$ across the non-zero region $\Omega$. The binary segmentation operator Z does not require advance knowledge of the value of the corrected estimate over the non-zero region $\Omega$.

In the case of three-(or 'n'-) phase fluid flow, more complex (i.e. 'n'-level) thresholding operations (derived from DT imaging) are used at step 250.

The space of binary images is not convex, so performing composition correction (step 250) at every iteration would quickly trap the method 200 in a false solution.

After step 250, the method 200 determines at step 260 whether the combined effect of the most recent updating, change-correction, and composition-correction steps 220, 230, and 250 have had no significant effect on the current estimate $\mu_d^{(n)}(r,t)$. That is, step 260 tests whether $$\|\mu_d^{(n)}(r,t) - \mu_d^{(n-1)}(r,t)\|_{L1} < \epsilon \quad (13)$$

where $\epsilon$ is the threshold used in step 240. If so, the method 200 concludes (step 270). Otherwise, the method 200 returns to step 220 for another iteration.

Experimental data was collected on the Australian National University X-ray micro-CT machine. The "bead-pack" sample was formed from a glass tube approximately 1 centimeter in diameter, packed with approximately spherical $AlSiO_2$ beads. The resulting pore-space was flooded with water, doped with 0.5 molar potassium iodide for contrast, to form the static sample. The sample was illuminated with diverging, partially-coherent X-rays from a tungsten target, filtered through 2 mm of $SiO_2$, with a characteristic peak energy of approximately 68 keV. The intensity of the transmitted X-rays was recorded using a Roper PI-SCX100:2048 X-ray camera as the image sensor.

A full "static" scan of 720 512-by-512 pixel radiographs was acquired at 720 viewing angles equally spaced over one complete revolution. The exposure time per radiograph was 1 second. Upon completion of the static scan, an extraction pump was turned on (defining time t=0) and the KI-doped water drained from the pore space. A second, "dynamic" radiograph set was collected as the water was drained; the dynamic set comprised 72 radiographs per complete revolution, at equally-spaced viewing angles, each with an exposure time of 1 second, as for the static scan. Clearly, compared to the static scan, the "dynamic" scan is under-sampled in terms of angle by one complete order of magnitude. The dynamic data acquisition continued until the fluid was completely drained: this took 30 full revolutions (approximately 43 minutes).

Figure 4:
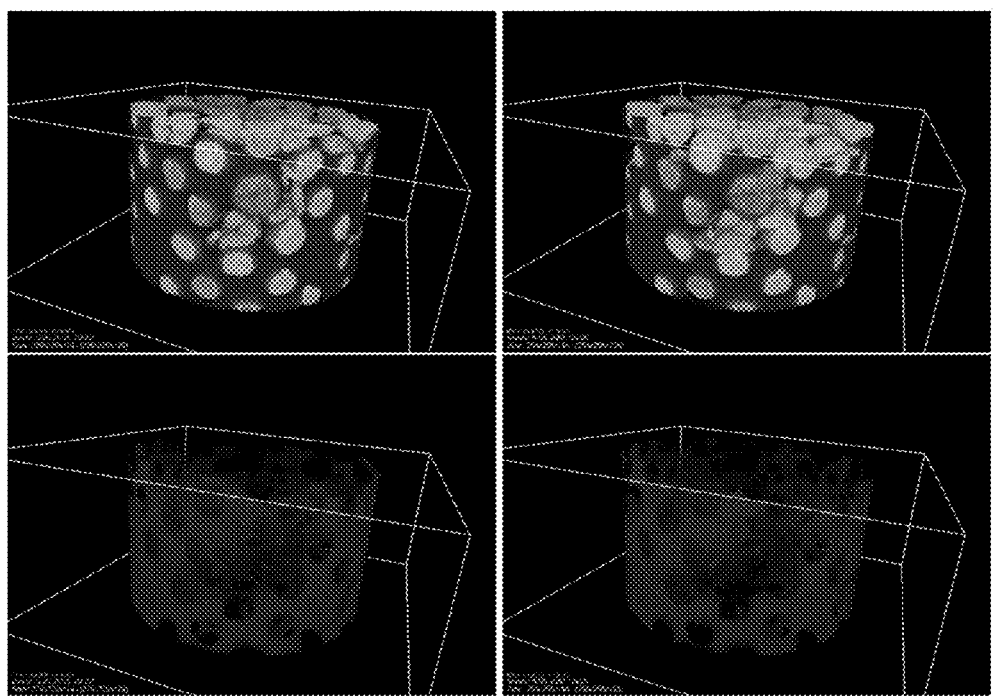
FIG. 4 shows results from carrying out the method of FIG. 2 on an experimental data set.

In this example, the static linear attenuation coefficient $\mu_s(r)$ corresponds to the saturated sample, and the dynamic component $\mu_d(r, t)$ corresponds to the voids that form as the fluid is drained. Reconstruction was carried out using the method 200 described above. 2D visualisations of two of the 3D images reconstructed from the dynamic data set are shown in FIG. 4. The left column shows two representations of the reconstructed 3D image at T=15 minutes 21 seconds, and the right column shows two representations of the reconstructed 3D image at T=15 minutes 59 seconds, that is one reconstruction instant later than the left column. The upper row in each column shows the static component and the dynamic component of the sample in different colours, whereas the lower row shows the dynamic component only.

Upon comparison of the 3D images in FIG. 4, the drainage of KI-doped water through the beadpack between successive reconstruction instants is clearly visible. The achieved reconstruction time resolution of 38 seconds per reconstructed 3D image is significantly better than may be achieved using the "brute force" reconstruction method (approximately 15 minutes per 3D image).

The arrangements described are applicable to the petroleum, geothermal power, and geosequestration industries, amongst others.

The foregoing describes only some embodiments of the present invention, and modifications and/or changes can be made thereto without departing from the scope and spirit of the invention, the embodiments being illustrative and not restrictive.

The invention claimed is:

1. A method of reconstructing a multi-dimensional data set representing a dynamic sample at a series of reconstruction instants, the multi-dimensional data set comprising a static component and a dynamic component, the method comprising:
acquiring a plurality of projection images of the dynamic sample;
reconstructing the static component of the multi-dimensional data set from the acquired projection images;
acquiring a further plurality of projection images of the dynamic sample; and
reconstructing the dynamic component of the multi-dimensional data set at each reconstruction instant from the further plurality of acquired projection images using a priori information about the dynamic sample,
the multi-dimensional data set being the sum of the static component and the dynamic component at each reconstruction instant.

2. A method according to claim 1, wherein the second reconstructing comprises:
updating a current estimate of the dynamic component using the further plurality of projection images; and
correcting the updated estimate of the dynamic component using the a priori information about the dynamic sample.

3. A method according to claim 2, further comprising:
determining whether stagnation has occurred, and
repeating, depending on the determination, the updating and correcting steps on the corrected updated estimate.

4. A method according to claim 3, further comprising:
composition correcting, depending on the determination, the corrected estimate of the dynamic component; and
determining whether the updating, correcting, and composition correcting have had a significant effect on the estimate of the dynamic component.

5. A method according to claim 4, further comprising repeating, based on the second determining, the updating, correcting, and stagnation determining.

6. A method according to claim 4, wherein the composition correcting comprises setting the corrected estimate to zero everywhere that the absolute value of the corrected estimate is less than a noise threshold.

7. A method according to claim 6, wherein the composition correcting comprises setting the corrected estimate to a value that preserves the average value of the corrected estimate everywhere that the absolute value of the corrected estimate is greater than or equal to than a noise threshold.

8. A method according to claim 2, wherein the correcting comprises:
encouraging spatial localisation of the changes in the updated estimate between acquisition instants of the further plurality of projection images.

9. A method according to claim 8, wherein the encouraging comprises setting the updated estimate to zero outside a spatial support region that is the complement of the spatial support region of the reconstructed static component of the multi-dimensional data set.

10. A method according to claim 2, wherein the updating comprises:
projecting the current estimate of the dynamic component at a plurality of viewing angles to form a plurality of projections;
forming difference images from the projections and the further plurality of projection images;
normalising the difference images by the projected path length through the sample;
backprojecting the normalised difference images; and
adding the backprojection to the current estimate of the dynamic component.

11. A method according to claim 10, wherein the forming comprises:
subtracting static contrast images of the static component of the dynamic sample from the further plurality of projection images to form dynamic contrast images of the dynamic sample; and
subtracting the projections from the dynamic contrast images.

12. A method according to claim 1, wherein the dynamic sample is a geological specimen extracted from a geological formation.

13. A method according to claim 12, further comprising determining, using the reconstructed multi-dimensional data set, one or more physical properties of the geological formation.

14. A method according to claim 13, further comprising extracting oil from the geological formation using the determined physical properties of the geological formation.

15. A method of reconstructing a series of multi-dimensional images representing a dynamic sample at a series of reconstruction instants from a set of projection images of the dynamic sample acquired at a plurality of acquisition instants and corresponding viewing angles, the method comprising, at each reconstruction instant:

projecting a current estimate of the multi-dimensional image at the reconstruction instant at the viewing angles to form a plurality of projections;

forming difference images from the projections and from a sequence of the projection images, wherein the sequence comprises consecutive projection images, acquired at acquisition instants surrounding the reconstruction instant;

normalising the difference images by the projected path length through the dynamic sample;

backprojecting the normalised difference images; and adding the backprojection to the current estimate of the multi-dimensional image at the reconstruction instant.

16. A method according to claim 15, wherein successive reconstruction instants are separated by half the time to acquire the projection images at viewing angles making up a complete revolution of the sample.

17. A method according to claim 15, wherein the sequence comprises projection images acquired at viewing angles making up a complete revolution of the sample.

18. A method according to claim 15, wherein the sequence comprises projection images acquired at acquisition instants symmetrically surrounding the reconstruction instant.

19. A non-transitory medium comprising computer program code, which when executed by a computer device, cause the computing device to perform a method of reconstructing a multi-dimensional data set representing a dynamic sample at a series of reconstruction instants, the multi-dimensional data set comprising a static component and a dynamic component, the computer program code comprising:

code for acquiring a plurality of projection images the dynamic sample;

code for reconstructing the static component of the multi-dimensional data set from the projection images;

code for acquiring a further plurality of projection images of the dynamic sample; and code for reconstructing the dynamic component of the multi-dimensional data set at each reconstruction instant from the further plurality of projection images using a priori information about the dynamic sample, the multi-dimensional data set being the sum of the static component and the dynamic component at each reconstruction instant.

20. A non-transitory medium comprising computer program code, which when executed by a computing device, cause the computing device to perform a method of reconstructing a series of multi-dimensional images representing a dynamic sample at a series of reconstruction instants from a set of projection images of the dynamic sample acquired at a plurality of acquisition instants and corresponding viewing angles, the computer program code comprising:

code for projecting, at each reconstruction instant, a current estimate of the multi-dimensional image at the reconstruction instant at the viewing angles to form a plurality of projections;

code for forming difference images from the projections and from a sequence of the projection images, wherein the sequence comprises consecutive projection images, acquired at acquisition instants surrounding the reconstruction instant;

code for normalising the difference images by the projected path length through the dynamic sample;

code for backprojecting the normalised difference images; and code for adding the backprojection to the current estimate of the multi-dimensional image at the reconstruction instant.

* * * * *